United States Patent [19]
Focqueur et al.

[11] Patent Number: 5,119,913
[45] Date of Patent: * Jun. 9, 1992

[54] FORCE TRANSMISSION LINKAGE FOR AUTOMOTIVE VEHICLES

[75] Inventors: Hervé Focqueur, Franconville; Bernard Jumel, Paris, both of France

[73] Assignee: Valeo, Paris, France

[ * ] Notice: The portion of the term of this patent subsequent to Jun. 2, 2009 has been disclaimed.

[21] Appl. No.: 589,543

[22] Filed: Sep. 28, 1990

[30] Foreign Application Priority Data

Sep. 29, 1989 [FR] France .................. 89 12747

[51] Int. Cl.⁵ .................. F16D 13/75; F16D 27/00; B60K 23/02
[52] U.S. Cl. .................. 192/83; 74/388 R; 192/84 R; 192/90; 192/103 R; 192/111 A
[58] Field of Search ............ 192/83, 82 P, 90, 111 A, 192/103 R, 84 R, 99 S; 74/512, 625, 388 R

[56] References Cited

U.S. PATENT DOCUMENTS

| | | | |
|---|---|---|---|
| 4,651,855 | 3/1987 | Grunberg | 192/90 X |
| 4,766,985 | 8/1988 | Brusasco | 192/84 R X |
| 4,829,221 | 5/1989 | Grunberg et al. | 192/90 X |
| 4,865,173 | 8/1989 | Leigh-Monstevens et al. | 192/0.02 R |
| 4,878,396 | 11/1989 | Grunberg | 74/518 |
| 4,890,711 | 1/1990 | Carmillet et al. | 192/98 |
| 4,934,503 | 6/1990 | Bacher et al. | 192/93 A |

FOREIGN PATENT DOCUMENTS

| | | |
|---|---|---|
| 0092950 | 11/1983 | European Pat. Off. . |
| 2253646 | 7/1975 | France . |
| 2319052 | 2/1977 | France . |
| 2372998 | 12/1980 | France . |
| 2594758 | 8/1987 | France . |
| 2611614 | 9/1988 | France . |
| 2616501 | 12/1988 | France . |
| 2124321 | 2/1984 | United Kingdom . |

*Primary Examiner*—Rodney H. Bonck
*Attorney, Agent, or Firm*—Longacre & White

[57] ABSTRACT

A force transmission linkage for an automotive vehicle couples a control member with a maneuvering member of a declutching device for a clutch, and is of the kind comprising a mechanical part with application points carried by a fixed part of the vehicle.

In accordance with the invention, one of the application points of the linkage is movable in both directions along a course of travel which is defined between two limit positions and under the action of an irreversible control device driven by a motor. At least one position sensor is associated with the control member and with the movable application point, respectively. A computer is provided, for receiving the information signals from the position sensors so as to control the motor of the control device.

10 Claims, 5 Drawing Sheets

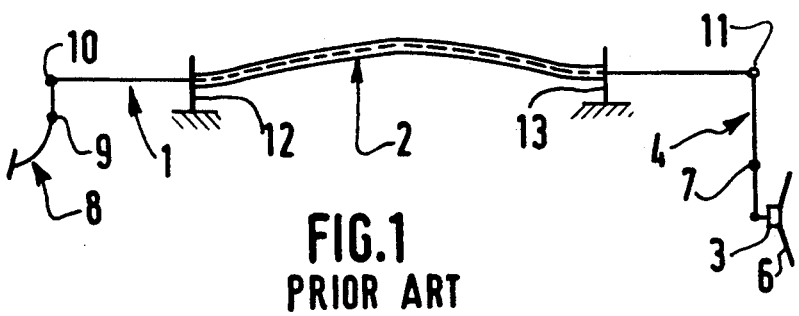
FIG.1
PRIOR ART
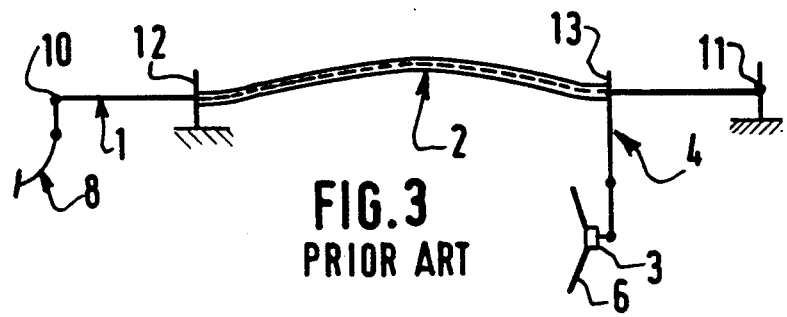
FIG.3
PRIOR ART
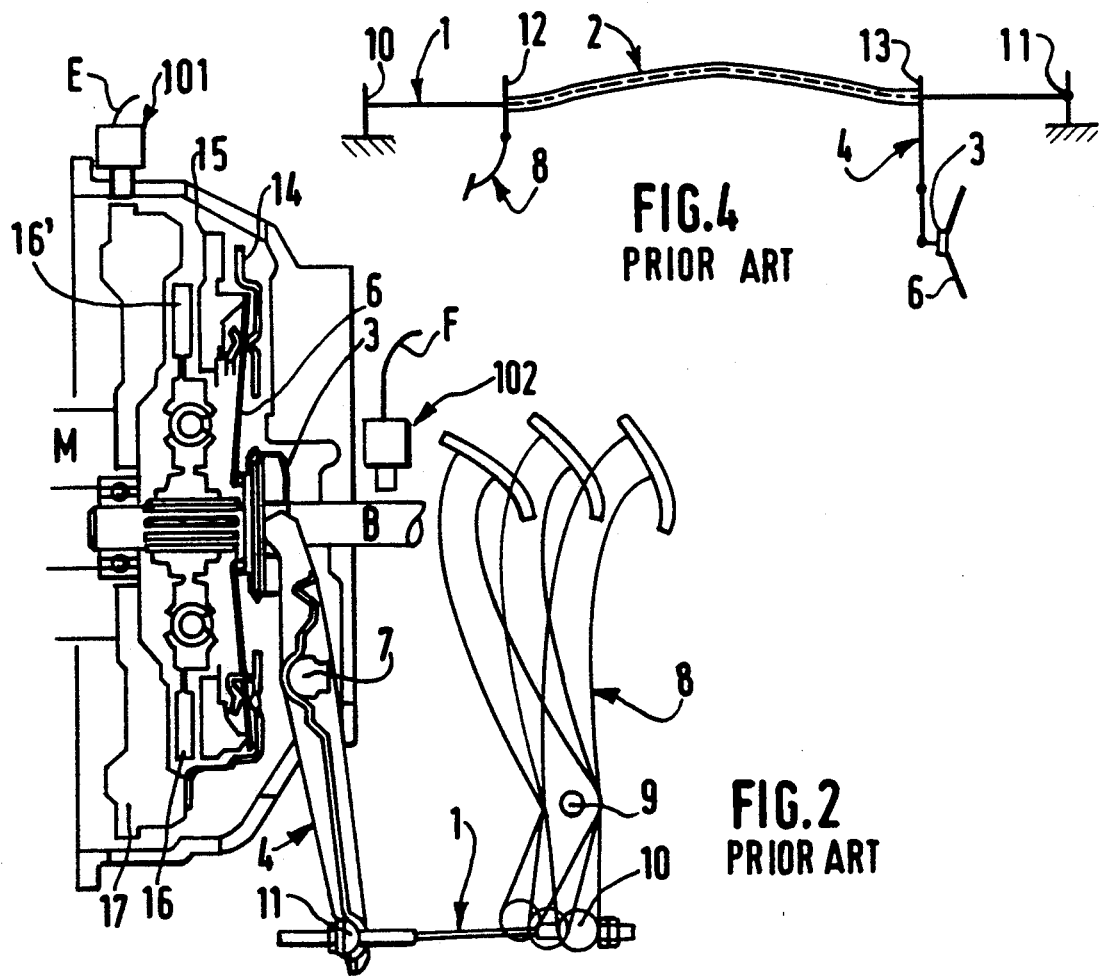
FIG.4
PRIOR ART
FIG.2
PRIOR ART

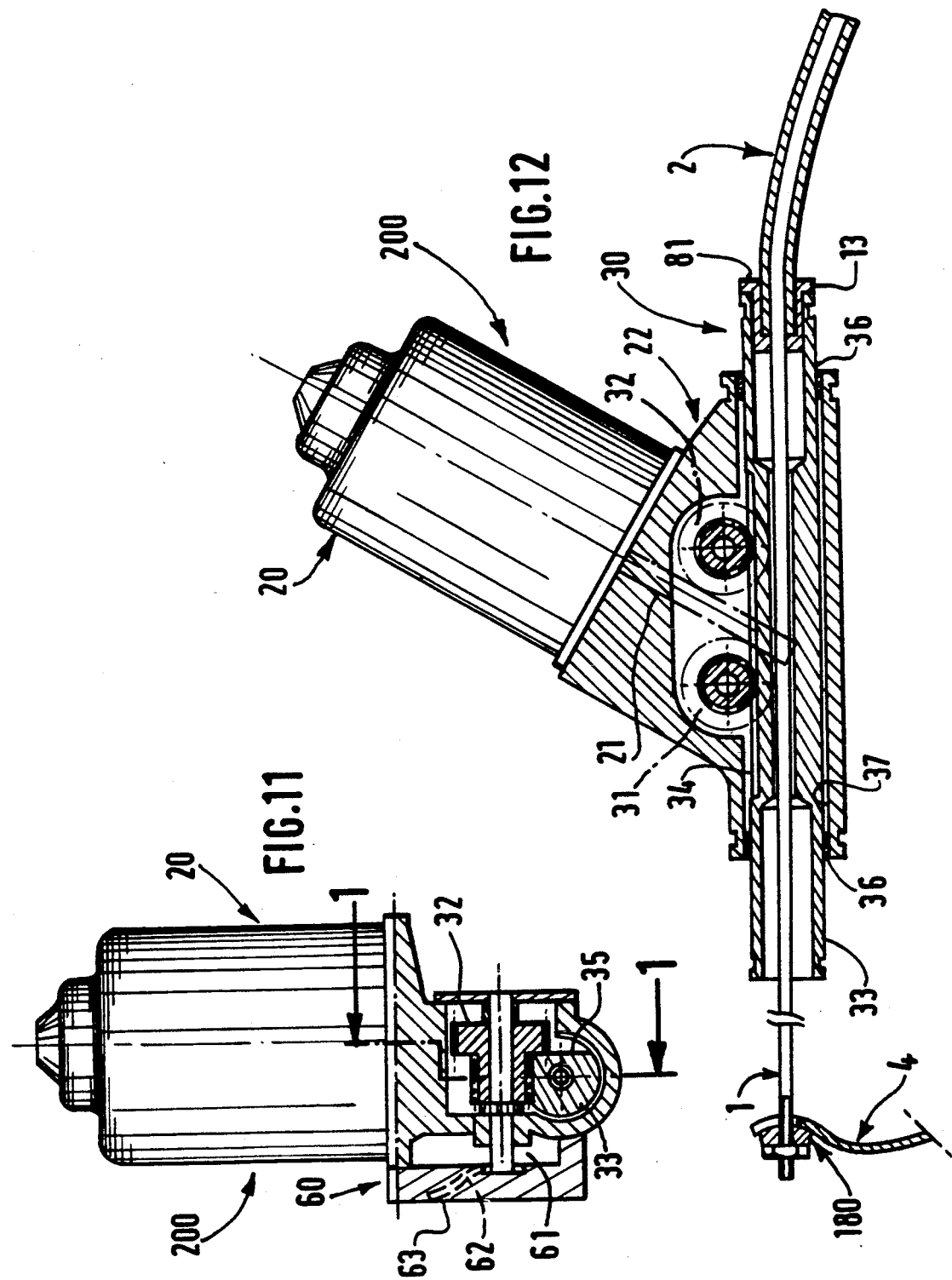

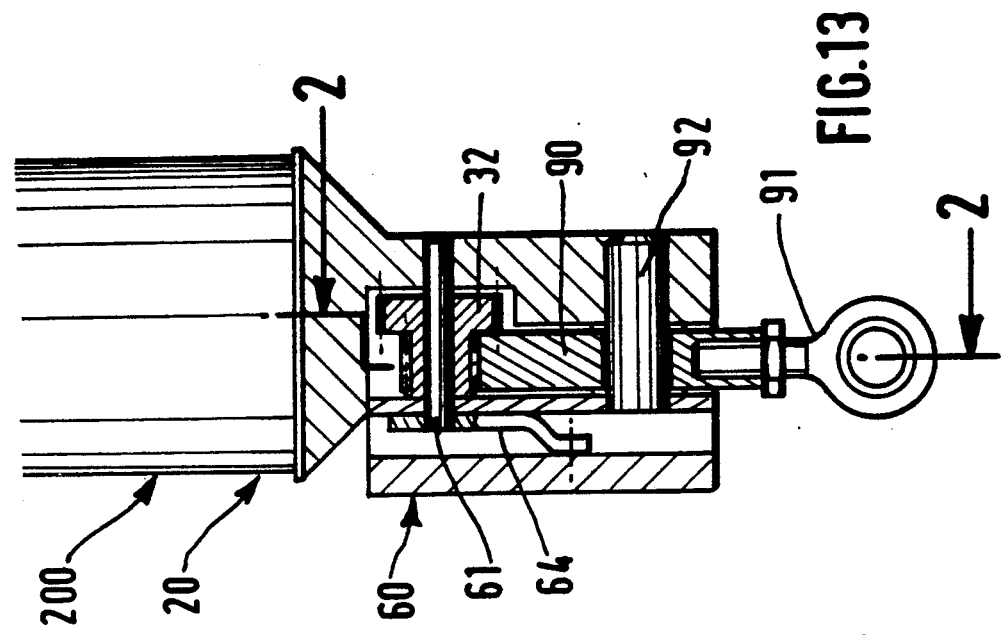
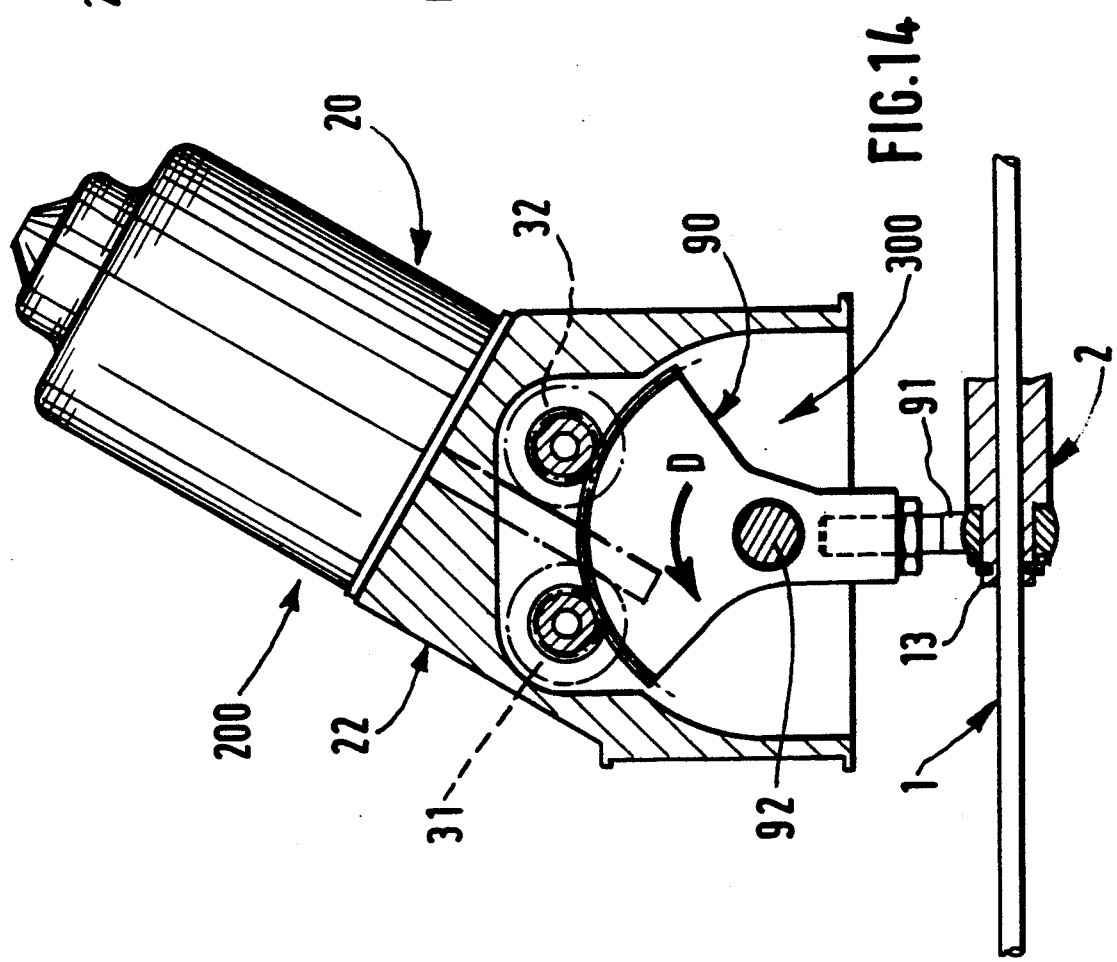

1

FORCE TRANSMISSION LINKAGE FOR AUTOMOTIVE VEHICLES

FIELD OF THE INVENTION

The present invention relates to linkages for transmitting forces in automotive vehicles, such a linkage being adapted to couple a control member with a manoeuvring member of a declutching device for a clutch and being of the kind including a mechanical part.

BACKGROUND OF THE INVENTION

Reference is here made to FIGS. 1 to 4 of the accompanying drawings. What these figures represent is explained in the section "Brief Description of the Drawings" which appears further on in this document, and to which reference is invited at this point.

Referring to FIGS. 1 and 2, the linkage commonly comprises a cable 1 which is movable axially, a sheath 2 surrounding this cable, and a fork 4 which is pivotally mounted about a pivot or articulation point 7, which may for example consist of a knuckle piece secured to a fixed part of the vehicle as shown in FIG. 2, or a spindle which is rotatable and which is carried by a fixed part of the vehicle. In a variant, the articulation point may consist of bearings, with the fork then carrying projections which are rotatable in the said bearings, the latter being for example mounted in the gearbox casing.

Generally speaking the articulation point 7 constitutes a guide or datum point for the linkage.

The manoeuvring member is a clutch release bearing 3 which is subjected to the action of the declutching fork 4, and which is adapted to act on the declutching device of a clutch such as the ends of the fingers of a diaphragm 6 or declutching levers. The control member 8 most often consists of a pedal pivotally mounted about a pivot point 9, which is again fixed with respect to a fixed part of the vehicle.

The cable 1 is attached at each of its ends 10 and 11 to attachment points at which it is attached to the pedal 8 and the fork 4 respectively, while the sheath 2 is interposed between two points 12 and 13 that are fixed with respect to the vehicle.

The pivot points together with the fixed points will together be referred to in this document as "application points" for the linkage, which may include an hydraulic part, for example between the fork 4 and the clutch release bearing 3. These application points have the essential feature that they are ultimately carried by a fixed part of the vehicle, being secured to such fixed part or mounted rotatably with respect to it.

It is not obligatory to provide the fork 4, in which connection the point 11 may be attached to a disc in the manner described in French published patent application No. FR 1 587 732A; alternatively, it may be attached to a driving member in the manner described in U.S. Pat. No. 4,934,503 and the corresponding published European patent application No. EP 0 322 265A.

In FIG. 1, when the pedal 8 is depressed, this exerts a pulling force on the cable 1 which, guided by the sheath 2, actuates the fork 4.

Referring to FIG. 3, the point 11 may of course be fixed while the point 13 can be movable by virtue of being attached to the fork 4, so that when the position of the point 10 is varied, this involves a corresponding variation in the position of the point 13. In a modified embodiment, see FIG. 4, the points 10 and 11 may be fixed and the points 12 and 13 may be movable, being attached respectively to the pedal 8 and to the fork 4. The cable 1 then serves to guide the sheath 2 which is then axially movable. In all cases, one of the elements consisting of the cable and its sheath is a force transmitting element, while the other one of these two elements is a guide element.

In a further variant, the linkage can include a force transmitting element which is in several parts, having a plurality of bars with a return system and at least one articulation point carried by a fixed part of the vehicle, this articulation point then constituting a guide or datum point for the linkage.

In practice, the course of travel of the control member 8 and the manoeuvring member 3 can be broken down into a dead stage, a modulating stage with sliding movement, and a final stage to give complete coupling by the clutch. For example, and referring to FIG. 2, in the case of a conventional friction disc clutch 16, the dead stage occurs between the declutching position, in which the friction disc is free, and an intermediate position, referred to here as a take-up position, in which the friction liners 16' of the clutch disc 16 come into light contact with the pressure plate 15 of the clutch. The modulating stage occurs with circumferential sliding movement of the friction liners 16' between the reaction plate 17 and the pressure plate 15 of the clutch, and with an increasing amount of torque being transmitted until coupling is complete at a position referred to as the coupling position. The final stage enables good coupling to be achieved between the driving shaft M and the driven shaft B of the clutch. The driving shaft M is secured to the engine of the vehicle, for rotation therewith, and the driven shaft B is the input shaft of the gearbox. The modulating stage is thus valuable for passenger comfort and in facilitating manoeuvring of the vehicle, while the dead stage is necessary having regard to manufacturing tolerances of the various components of the clutch, and also having regard to distortion effects, in particular the tendency of the pressure plate 15 to assume a slightly conical shape due to thermally induced forces to which it is subjected.

It should be mentioned here that the pressure plate 15 is rotatable with a cover plate 14, being movable axially with respect to the latter. This cover plate 14 is adapted to be carried on the reaction plate 17, while the diaphragm 6 bears on the cover plate 14 for action on the pressure plate 15 and for urging the latter towards the reaction plate 17, so that the friction pads 16' are gripped between the pressure plate 15 and the reaction plate 17. The plate 17 is secured to the engine or driving shaft M, while the clutch disc 16 is secured to, and rotatable with, the secondary or driven shaft B.

It has already been proposed, in French published patent application No. FR 2 319 052A, to provide an arrangement with a control lever in which both the sheath and the cable are cut or divided into two pieces, between which there is arranged an assisting device which comprises an electric motor with a speed reduction unit. This device provides assistance to the driver at the instant of declutching. With such an arrangement the driver normally has no opportunity to carry out the modulating stage. It has also already been proposed, in French published patent application No. FR 2 253 646A, to provide an hydraulic arrangement which again enables the dead stage of the course of travel to be performed with the aid of an assisting device. Such an arrangement necessitates the provision of hydraulic control.

SUMMARY OF THE INVENTION

An object of the present invention is to provide a novel linkage which, in a simple and economic manner while including a mechanical part, allows a dead stage to be carried out while enabling the driver to perform the modulating stage; and to obtain other advantages.

In accordance with the invention, a linkage of the kind defined above is characterised in that one of the said application points of the linkage is directly or indirectly movable in both directions in a course of travel defined between two limit positions and under the action of irreversible control means, the said control means comprising motor means and a transmission acting between the said motor means and the said movable application point; in that at least one position sensor is associated with the control member and the said movable application point respectively; and in that a computer is provided, with the said computer receiving information signals from the said position sensors so as to control the said motor means, in such a way that, in response to actuation or release of the control member by the driver, and consequently action of the control member on its associated position sensor, the computer causes the motor means to operate so as to displace the said movable application point, in a first direction or in a second direction according to the action exerted by the driver on the control means, up to an end of travel position which is detected by the position sensor associated with the movable application point, and whereby also the said movable application point is fixed by means of the irreversible control means when the driver actuates the control member manually.

The invention makes it possible mainly to perform the dead stage of the course of travel using the control member itself, by detecting the position of the end of the travel of the latter. It will be noted that the application point that is carried by a fixed part of the vehicle, being displaced directly or indirectly, is a reaction point associated with the guide element, or, in a modification, with a guide point. It is mainly due to the irreversibility of the control means that the driver is able to carry out the modulating stage manually.

It will be appreciated that the invention enables the maximum possible number of components found in a conventional linkage between a control member and a manoeuvring member to be preserved, so making a linkage according to the invention both economical and simple; and that the linkage can be fitted quite simply in place of a conventional linkage. In addition, where the linkage is used in connection with an automatic transmission, of the kind described in U.S. Pat. No. 4,878,396 and the corresponding French published patent application No. FR 2 523 743A, the control means are simplified.

Preferably, the sensor for sensing the position of the movable application point is a potentiometer, which enables a single sensor to be used for signalling the limits of the course of travel of the movable application point in each direction.

It will further be appreciated that the invention enables two contradictory requirements to be reconciled, for a substantially constant course of travel of the control member: namely to increase the modulation stage without reducing the dead stage and without having recourse to an hydraulic device.

In accordance with a major feature of the invention, a sensor is provided which detects the free position of the control member, together with sensors which are arranged to detect slipping movement of the friction disc and/or predetermined rotational velocity. This makes it possible to arrange for the motor means to act in such a way as to cause the friction disc to slip without the driver having to intervene using the pedal. Controlled slipping is thus obtained, such as to enable, in particular, momentary overtorques from the engine to be absorbed, which improves the useful life of the transmission components, reduces noise and avoids clutch snatch, to the benefit of the comfort of the occupants of the vehicle.

In addition, handling errors by the driver can be overcome: for example too rapid an engagement of the clutch is moderated by a slipping action, leading to a reduction in the violence of the resulting shocks.

It will be noted that such an arrangement is impossible with an hydraulic device as disclosed in the above mentioned French published patent application No. FR 2 253 646A. The present invention also enables the final stage of the course of travel to be modulated, and permits modulation to be carried out using the motor means.

In accordance with a further feature of the invention, the defined course of travel of the movable member can be developed in an evolutionary manner, and a sensor can be added to the linkage for detecting a traction force or pull in the sheath or in the cable, in such a way that it is possible to take up any wear by displacing the movable application point until a zero residual force in the linkage is detected, the control member then being in its free position.

It will be appreciated that the force transmission element is not cut, and that, in general terms, in the case of failure of the control means, it is still possible to disengage the clutch, with the driver then performing only a small part of the dead stage of the course of travel.

The features and advantages of the invention will appear from the description of preferred embodiments of the invention which is given below, by way of example only and with reference to the accompanying drawings.

BRIEF DESCRIPTION OF THE DRAWINGS

FIG. 1 is a diagrammatic view of an actuating linkage of the prior art, in a first embodiment.

FIG. 2 is a diagrammatic view showing a friction clutch associated with the linkage of FIG. 1.

FIGS. 3 and 4 are views similar to FIG. 1, showing respectively two further embodiments.

FIG. 11 is a front view of the motor means with their associated irreversible transmission, in a first embodiment.

FIG. 12 is a view in cross section, taken on the line I—I in FIG. 11, but with the electric motor not shown in cross section.

FIGS. 13 and 14 are views similar to FIGS. 11 and 12 but showing a second embodiment.

DESCRIPTION OF PREFERRED EMBODIMENTS OF THE INVENTION

Figure 5:
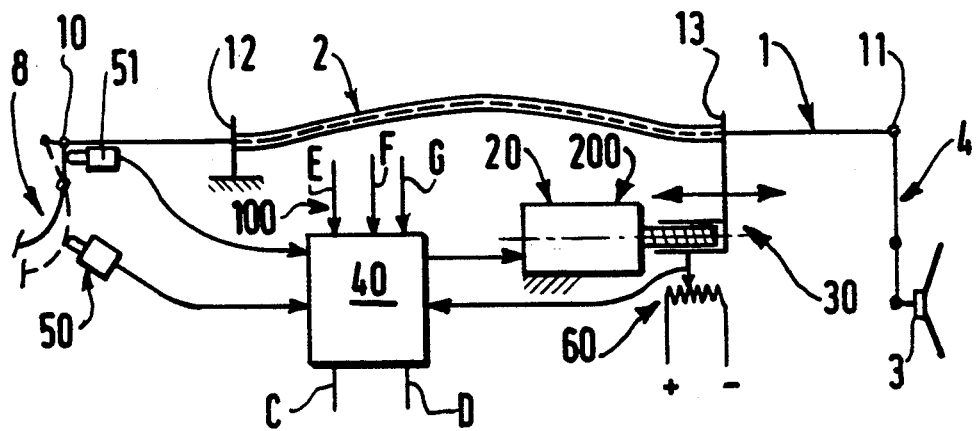
FIG. 5 is a diagrammatic view of the linkage, similar to FIG. 1 but showing a first embodiment of the present invention.

In FIGS. 5 to 14, those elements that are identical to those described above with reference to FIGS. 1 to 4 are designated by the same reference numerals, the application points (this term having the meaning explained earlier herein) being points ultimately carried by a fixed part of the automotive vehicle and the latter having an internal combustion engine.

Referring to FIG. 5, the linkage includes an application point 13 which is directly movable with respect to its fixed vehicle support in both directions in a course of travel which is defined between two limit positions and under the action of irreversible control means 200, which include motor means 20 and a transmission 30 interposed between the motor means 20 and the application point 13. Position sensors 50 and 60 are associated respectively with the control member 8 and with the movable application point 13. A computer 40 is provided for receiving the information signals supplied by the position sensors 50 and 60 and for controlling the motor means 20 in response to this information. On depression or release of the control member 8 by the driver, with resulting action by the control member 8 on its associated position sensor 50, the computer 40 energises the motor means 20 so as to displace the movable application point in a first direction or in a second direction, in accordance with the action exerted by the driver on the control member 8 up to a terminal position at the end of the course of travel. This terminal position is detected by the position sensor 60 associated with the movable application point 13. Under the action of the control member 8, when the position sensor 50 associated with it does not give a signal which is capable, via the computer 40, of energising the motor means 20, the control means 200 keep the movable application point 13 in a fixed position.

More precisely, in FIG. 5, as in FIGS. 11 to 14 described below, it is the transmission 30 that is irreversible, and it is the application point 13 associated with one end of the sheath 2 that is movable. The position sensor 50 associated with the pedal 8 is in the form of a switch for detecting the end of the travel of the pedal, while the sensor 60 which is associated with the movable application point 13 is in the form of a potentiometer, the mid point of which is connected to the computer 40. The computer 40 has supply inputs C and D, together with signal inputs for receiving signals E, F, and G respectively. The signals E and F are delivered by sensors 101 and 102 (FIG. 2). The signals E, F and G represent, respectively: the rotational velocity of the reaction plate 17 of the clutch, and therefore that of the driving shaft M; the rotational velocity of the secondary or driven shaft B; and a parameter which is related to the acceleration of the vehicle, such as the position of the butterfly valve of the carburettor or the position of the accelerator pedal. The computer 40 receives the signals from the sensors 50 and 60 as well as that from a further sensor 51 which detects the free position of the pedal 8, i.e. it detects when the driver's foot is not on the pedal. The sensor 51 is, in the arrangement shown in FIG. 5, a switch or interruptor.

Thus, when the driver operates the pedal 8 with his foot, so that the switch 50 is not operated by the pedal 8, the clutch torque can be modulated manually, with the friction disc 16 of the clutch then going progressively from the engaged state to the disengaged state and vice versa while the point 13 remains fixed because of the irreversibility of the transmission 30.

When the driver pushes the clutch pedal 8 hard down, this operates the switch 50 (indicating that the clutch pedal has been operated), and the computer 40 receives the appropriate signal and triggers energisation of the motor means 20. The latter then cause the movable application point 13 to be displaced in a first direction, up to a first extreme position which is set by the potentiometer 60, so as to effect the dead stage of the course of travel of the clutch in a first direction.

When the driver then releases pressure on the pedal, the latter returns to its free position, and the switch 50 therefore reverts to its initial mode. In response to this, the computer energises the motor means 20 in the opposite direction, so that the movable application point 13 is displaced in the opposite direction up to a second extreme position, which is again set by the potentiometer 60. It will thus be seen that the application point 13 is movable in both directions along a defined course of travel between two extreme limit positions which are determined by the potentiometer 60.

When the pedal is in the relieved or free position, the sensor 51 transmits a signal to the computer 40, such that the latter will energise the motor means 20 when, through its input G from an associated sensor that detects a variation in the acceleration of the vehicle (such as a sensor responsive to the position of the carburettor butterfly valve or an accelerometer), it will detect major variations in acceleration (for example), so as to disengage and engage the clutch. This has the particular result of improving the comfort of the occupants of the vehicle. The sensors which transmit the signals E and F make it possible to arrange for the clutch to change its mode smoothly, in accordance with a characteristic curve determined in advance, over a predetermined range of its travel, thus reducing noise and shock.

Due to the signals E, F and G in combination, driver's errors can be minimised, as such errors are absorbed in a controlled engagement of the clutch.

Figure 6:
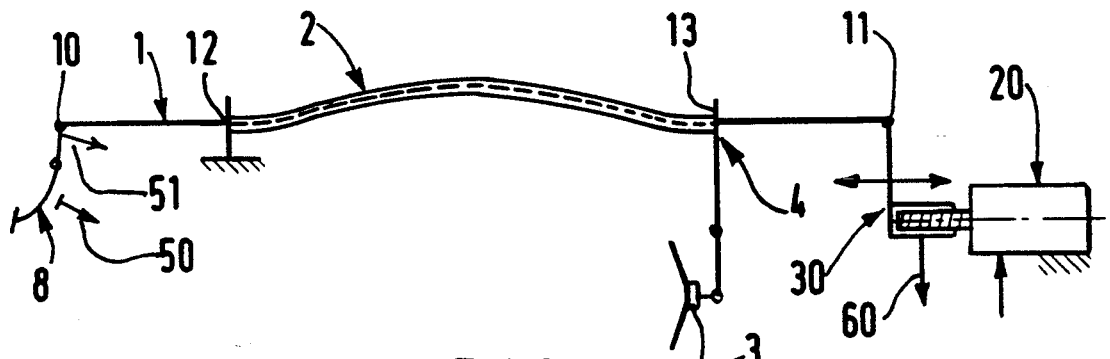
FIGS. 6 to 10 are views similar to FIG. 5, showing further embodiments of the invention, but with the computer being omitted from FIGS. 6 to 9.
Figure 7:
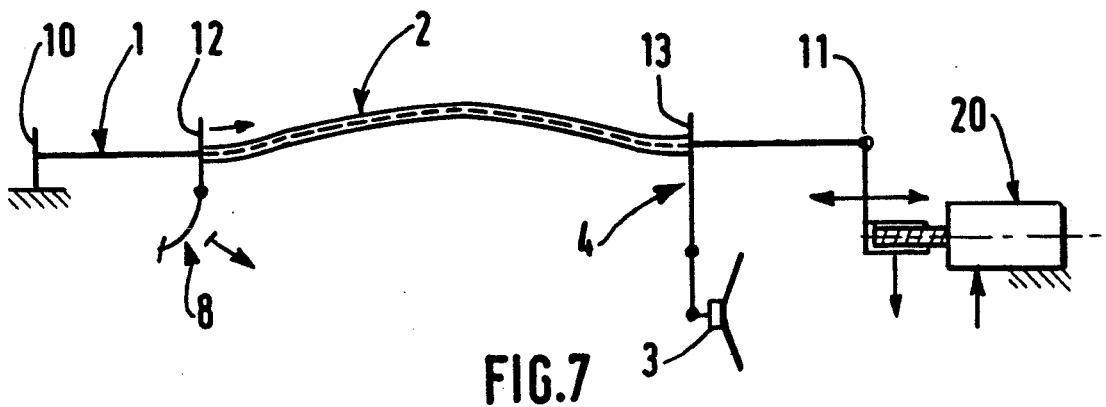

In FIG. 6, it is the end point 11 of the guide cable 11 that is movable, and the same is true in FIG. 7 by contrast with the embodiment shown in FIGS. 3 and 4.

Figure 8:
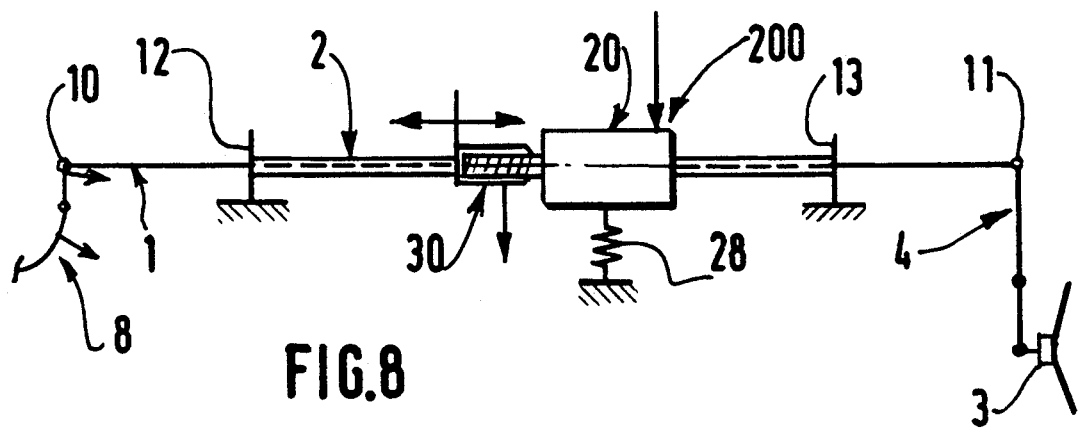

Referring now to FIG. 8, the guide sheath 2 is divided into two pieces between the two fixed application points 12 and 13, and it is the point at which the sheath is divided that is movable, given that a deformation of the sheath 2 causes the relative position of the points 10 and 11 to vary. This arrangement results in indirect displacement of the movable points 12 and 13, since mobility of the point at which the sheath is divided causes the relative positions of the points 10 and 11 to vary in the same way as in FIG. 5, the only difference being that the guide sheath 2 is cut, the force transmitting cable remaining intact.

The housing of the motor means 20 is of course connected resiliently, for example by means of a spring 28, to a fixed part of the vehicle in order to enable it to adapt to the movements of the sheath 2. This housing also preferably contains the irreversible transmission. In this way the control means 200 can be made as a single unit.

Figure 9:
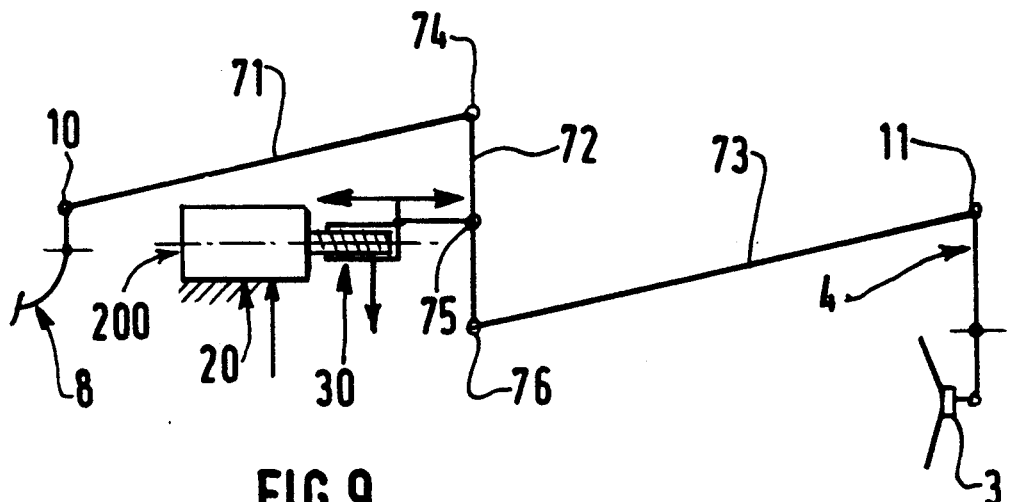

Referring now to FIG. 9, the wear effect sensor, here denoted by the reference numeral 380, is associated with the application point 11, and the linkage comprises a train of rods 71, 72, 73 with respective pivot points 74, 75, 76 between the ends 10 and 11 of the train of bars constituting the linkage. The pivot point 75 is ultimately secured to a fixed part of the vehicle and constitutes the datum or guide point for the linkage, the latter being movable. The force transmission element is thus in several parts in this case, namely the rods 71 to 73.

Figure 10:
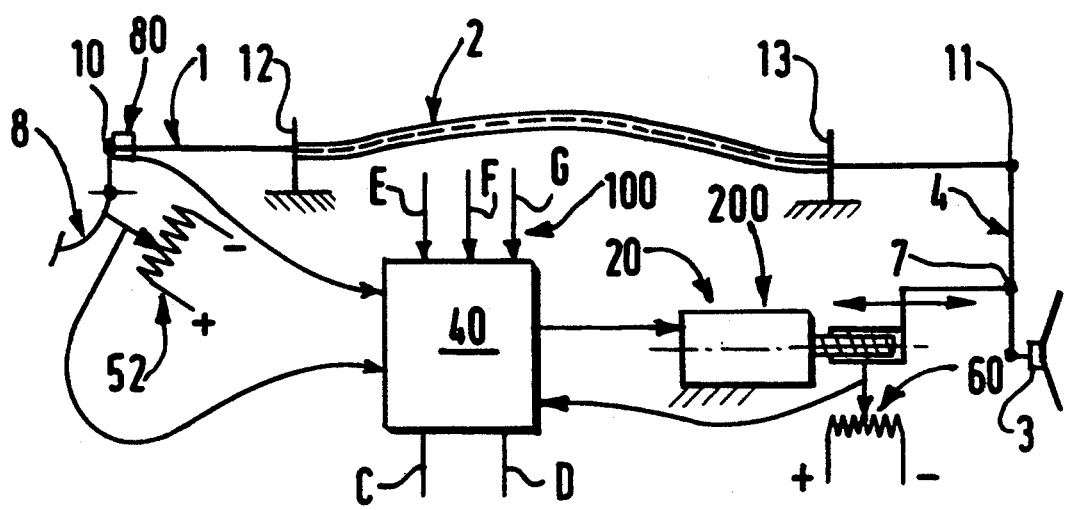

Reference is now made to FIG. 10, in which the pivot point 7 of the fork 4 constitutes the datum point for the linkage. In this case the linkage is movable. It will be noted that in FIG. 10, the two sensors 50 and 51 have been replaced by a potentiometer 52 which detects the free position and the depressed position of the pedal 8. It will also be noted that the wear effect sensor 80 is associated with the cable 1 and detects the pull on the cable as the friction pads 16' become worn. This sensor 80, disposed within the linkage, detects whether or not there is an internal force in the linkage.

More precisely, in FIG. 10, the sensor 80 is arranged at the level of the pedal 8, while in the embodiment shown in FIGS. 11 and 12, to which reference is now directed, it can be seen that the sensor 180 is interposed between the upper end of the fork 4 and a fastening screw for the cable 1. It can of course detect a force exerted on the sheath, when associated with the point 12 or 13.

Although it is possible to employ a strain gauge for the sensor 80, preferably this sensor is in the form of a switch associated with a return spring or a rubber element carrying contact strips. Deformation causes the contacts to be closed.

It will be recalled that, as the friction pads 16' become worn, the thickness of the latter varies in such a way that the diaphragm 6, which in the example shown in FIG. 2 is mounted pivotally on the cover plate 14 with the clutch release bearing 3 acting in thrust, becomes inclined and displaces the clutch release bearing 3, which pulls indirectly on the cable 1 by acting on the fork 4. The pedal is normally biassed into its free position by a spring. When the pedal is free it is this additional pulling force due to wear that is detected by the sensor 80 or 180, and the latter transmits a signal to the computer 40, which energises the motor means 20, as explained above, until a zero residual force is obtained. The computer can be programmed so that it will carry out this operation under predetermined situations, for example whenevr the engine of the vehicle is started or stopped. It should be noted that the free position of the pedal is that in which it is not being operated by the driver.

In the embodiment shown in FIGS. 11 and 12, the motor means comprise an electric motor, while the transmission includes intermediate worm wheels 31 and 32 which mesh with a worm 21. The latter is driven by the electric motor 20, the arrangement being similar to that described in French published patent application No. FR 2 372 998A. The worm 21 is in two portions having different pitches, each of these portions meshing with a respective one of the worm wheels 31, 32. Each of the latter is of the double type, and includes a part which is adapted to mesh with a rack 34 formed on a sliding member 33.

The electric motor 20, together with the irreversible transmission 30 which comprises the worm 21 with its two worm wheels 31 and 32 meshing with the rack 34, is housed in a common housing 22, with the sliding member 33 being movable longitudinally in a bore 37 of the housing 22, in which guide rings 36 are mounted. The control means 200 thus form a single unit.

The cable 1 extends into the interior of the sliding member 33. At one of its axial ends, the latter has a shouldered plug 81, having a generally U-shaped cross section, with radial ends defining a shoulder for engagement on the housing 22. This plug 81 receives the end of the sheath 2, and is secured to the sliding member 33, for example by means of a force fit. In a modification, it may be made integral with the sliding member. It will be noted that the sliding member 33 is formed with a flattened portion 35 to accommodate the worm wheels 31 and 32.

The axis of the worm wheel 32 is extended, as indicated at 61, in order to drive an arm 62, which is the cursor of the potentiometer 60. This latter is mounted within a casing 63 secured to the housing 22. Thus, when the electric motor 20 is driven, the worm 21 rotates in one direction and drives the worm wheels 31 and 32, which displace the rack 34 and therefore the plug 81 and the sheath 2, until the arm 62 reaches an end position. Movement in the opposite direction is then possible from this position, until the arm 62 reaches the second extreme position of the potentiometer 60. In this embodiment, it is the application point 13 that is thus movable.

It will be noted that, when the pedal 8 pulls on the cable, the sheath 2 cannot also be pulled, because of the irreversibility of the transmission 30 and the fact that the motor 20 is not energised. By contrast, the sliding member 33 is able to be displaced in both directions by the electric motor 20.

The curvature of the sheath 2 is able to be varied by displacement of the movable application point, so that the fork 4 is caused to pivot, with the potentiometer 60 then detecting the end of the travel of the application point 13. The effect of this is that a signal is transmitted to the computer 40, which stops the electric motor 20. The latter is then not supplied with further power. On re-engagement of the clutch, the potentiometer permits the movable application point 13 to revert to its initial position, so as to enable the modulation stage to be carried out by the driver of the vehicle. The position of termination and commencement of the course of travel is memorised by the computer 40 on each occasion when wear is taken up, so as to displace, in successive evolution, the limit positions of the movable application point 13.

Reference is now made to FIGS. 13 and 14, in which the motor means 20 are again in the form of an electric motor. However, in this embodiment the irreversible transmission, here denoted by the reference numeral 300, does not have the rack 34 or sliding member 33. Instead, it has a toothed sector 90, which meshes with the worm wheels 31 and 32 and which is mounted about a pivot point 92 that is fixed with respect to the fixed housing 22. On rotation of the worm wheels 31 and 32, the sector 90 undergoes pivoting movement so as to displace the application point 13. The latter is carried on the lower end of the sector 90 by means of a ring-type fastening 91.

As will be clear from the foregoing, the motor means 20 and the irreversible transmission 30 or 300 associated with it constitute control means which act on the linkage, while the computer 40 and the various sensors 50, 60 or 51, 52, 80 constitute driving means for the said control means.

The present invention is of course not limited to the embodiments described above, but embraces all variants within the broad scope of the claims. In particular, the motor means may be of an hydraulic type, with the computer 40 then controlling an electric pump which varies the pressure in a chamber which is defined by a cylinder and a piston, so as to displace the piston and thus a movable application point of the linkage.

Similarly, the irreversible transmission may include an electric motor having a worm or lead screw meshing with a reduction gearing including pinions, one of the pinions of the meshing means including a spiral groove, into which a finger or lug penetrates. This finger or lug is fixed with respect to one end of a pivoting lever, the other end of which also has a finger which is in engagement with the screw thread of a movable member mounted in a bore formed in the housing. Then, when the motor is in rotation, the lever is caused to pivot so as to drive the movable member in displacement, with the latter carrying one of the application points of the linkage, for example one end of the sheath 2. The cable 1 passes through the said movable member.

The motor means 20 may themselves be irreversible, by a suitable arrangement of the magnetic fields, for instance; alternatively, irreversibility of the motor means may be achieved by the use of a brake, arranged to act for example on the output shaft of the motor.

As mentioned above, it is of course not obligatory to provide the linkage with a fork, and the linkage may include an hydraulic part. For example, in FIG. 9, the application point 11 may be connected to a disc which is rotatably mounted on a fixed part of the vehicle, with this disc being part of a system comprising a crank and connecting rod, the crank being coupled to the piston of an output cylinder, the latter being connected through suitable ducting to an input cylinder which actuates the declutching fork.

The control member of the linkage may be in the form of a lever or handle, for example for a power drive under the control of the driver of the vehicle.

The application points 10 and 12 may be made movable. For example, in FIG. 5 the application point 12 may be displaced instead of the application point 13, while in FIG. 7 the point 10 may be displaceable instead of the point 11.

The potentiometer 60 may be replaced by two switches, comprising respectively a switch corresponding to the commencement of the course of travel, and one corresponding to the termination of the course.

The electric motor may be arranged to rotate in only one direction, and its output shaft or axis 21 may be coupled mechanically through an irreversible reduction gear, comprising a plurality of pinions, to a driving element cooperating with a transverse pin-type element carried by a sliding member. The driving element then comprises two peripheral projections, substantially in the form of helical sections, which are inclined in opposite directions with respect to the axis of the driving element, with these peripheral projections also being offset axially and angularly from each other.

In FIGS. 6 and 7, the sensor 80 can of course be arranged to detect a supplementary force on the sheath, by being associated with either the application point 12 or the application point 13, while in FIGS. 5, 8 and 9, the sensor may be associated with the application point 10 or 11.

Although the sensor 80 is able to detect wear indirectly, by virtue of its association with the guide element, this sensor is preferably associated with the force transmission element in order to produce the most effective detection.

Compensation for wear is not necessarily associated with the irreversible transmission 30 or 300.

Finally, for example in FIGS. 6 and 7, it is possible to make the application point 11 (or the application point 10) indirectly movable by cutting the cable 1 into two parts, and by displacing the point at which the cable is cut in a manner analogous to that described above with reference to FIG. 8 in connection with the sheath, it being understood that, in all cases, only one of the two elements comprising the cable 1 and the sheath 2 is cut. The housing 22 is then of course suspended elastically like that in FIG. 8.

In every case, the guide element is cut while the force transmission element remains intact.

The presence of the sensor which is associated with the movable application point is not obligatory. If it is omitted, the computer may be programmed in such a way as to generate a signal representing the position for the motor means in response to a control signal produced by the sensor which is associated with the control member (e.g. the pedal), in such a way as to displace the movable application point from one of its limit positions to the other.

For example the motor means may comprise an electric motor of the stepping type, for displacing the movable application point from one end position corresponding to one of its limit positions, to another end position corresponding to its other limit position. This progression will take place in response to a limited number of command pulses of predetermined duration, generated by the computer in response to the control signal from the associated sensor. Memorisation of the end positions will then take account of actual wear, in particular wear of the friction pads or liners of the clutch, so that the command pulses are evolved as a function of actual wear.

In every case, a course of travel of the movable application point involves movement of the manoeuvring member.

Finally, the driver can carry out part of the dead stage of the course of travel manually, but with the major part of the dead stage being effected by the control means.

What is claimed is:

1. An operating mechanism for the clutch of an automotive vehicle having a fixed part, the mechanism comprising a declutching device which is associated with the clutch and which includes a manoeuvreing member, and further comprising a control member, operable by the driver of the vehicle, and a force transmission linkage coupling said control member with said manoeuvreing member, said linkage comprising a mechanical part including a force transmission element in at least one piece, the mechanical part also including means defining a plurality of application points carried by said fixed part of the vehicle, the linkage further comprising irreversible control means and a computer, and said control means comprising a motor means and a transmission means coupled with the motor means to be driven thereby, one of said application points being connected through said transmission means to said fixed part to be movable with respect to said fixed part by said transmission means in both directions in a course of travel defined between two limit positions thereof, wherein the linkage further comprises at least one first position sensor associated with said control member and at least one second position sensor associated with the movable application point, the computer being connected with the position sensor or sensors and with the motor means for controlling the latter in response to information signals from the position sensors, whereby when said control member is actuated or released by the driver so that the control member acts on at least one said first position sensors, the computer causes the motor means to drive the transmission means so as to displace the movable application point with respect to said fixed part, in a direction selected from a first direction and a second direction according to the action exerted by the driver on the said control member, up to a terminal position in said movable application points course of travel, the second position sensor being arranged for detecting said terminal position, and whereby the movable application point is fixed with respect to said fixed part by said control means on manual actuation of said control member by the driver.

2. A mechanism according to claim 1, for a clutch comprising a pressure plate, a reaction plate, a friction disc between the pressure plate and the reaction plate, and means for causing the friction disc to be gripped by the pressure plate and the reaction plate, wherein one said first position sensor is associated with said control member for detecting a free position of the latter when the control member is not actuated by the driver, the clutch being coupled with a driving shaft and a driven shaft, and wherein the linkage further comprises speed sensors for detecting the rotational velocity of said driving shaft and driven shaft, so that in said free position of the control member, said first position sensor associated with the control member transmits a signal to the computer so that the computer then causes said motor means to be operated in accordance with a pre-established characteristic in response to signals from said speed sensors.

3. A mechanism according to claim 1, wherein the linkage further comprises a supplementary strain detection sensor for detecting a supplementary strain in the linkage when the control member is in a free position, such that the supplementary strain detection sensor being connected with the computer so as to transmit a signal to the computer when a supplementary strain is present in the linkage, whereby the computer can cause said motor means to operate so as to displace the movable application point in a sense such as to compensate for wear in the clutch.

4. A mechanism according to claim 1, wherein said second position sensor is a potentiometer.

5. A mechanism according to claim 1, wherein:
said motor means comprises an electric motor and a worm driven by the electric motor; and,
said transmission means includes worm wheels meshing with said worm.

6. A mechanism according to claim 5, further comprising:
a housing for said motor means and said transmission means, said housing defining a bore therein, a sliding member mounted in said bore for sliding movement therein along an axis with respect to the housing, and a rack formed on the sliding member and meshing with said worm wheels;
said force transmission element comprising a cable and surrounding sheath, an end of said sheath comprising said movable application point and being associated with and moved by said sliding member.

7. A mechanism according to claim 5, further comprising:
a housing for said motor means and said transmission means; and,
a toothed sector pivotally mounted with respect to the said housing, said toothed sector having a toothed portion, meshing with the said worm wheels, and another portion engaging and moving said movable application point by pivoting motion of said toothed sector with respect to said housing.

8. A mechanism according to claim 1, wherein said motor means are irreversible.

9. A mechanism according to claim 1, wherein said linkage comprises a cable and a sheath surrounding the cable, the cable defining two end points and said movable application point being that one of said end points of the cable that is at the end thereof remote from said control member.

10. A mechanism according to claim 1, comprising a cable and a sheath surrounding the cable, the sheath defining two said application points at least one of which is located at an end of the latter, and said movable application point being a said point defined at an end of the sheath.

* * * * *